United States Patent [19]

Le Cornec

[11] 4,094,314

[45] June 13, 1978

[54] PRESSURE REGULATOR FOR BREATHING APPARATUS

[75] Inventor: Jacques Le Cornec, Saint Esteve, France

[73] Assignee: Gilles Atlan, Marseilles, France

[21] Appl. No.: 694,819

[22] Filed: Jun. 10, 1976

[30] Foreign Application Priority Data

Jun. 30, 1975 France .............................. 75 20858

[51] Int. Cl.² .............................................. A62B 7/00
[52] U.S. Cl. ................................. 128/142.2; 251/359; 251/362; 251/174
[58] Field of Search ................ 128/142.2, 142 R, 147; 251/359, 360, 362, 174, 172, 175

[56] References Cited

U.S. PATENT DOCUMENTS 2,866,477  12/1958  Bredtschneider et al. .......... 251/174

3,028,860  4/1962  Gagnan et al. .................... 128/142.2

FOREIGN PATENT DOCUMENTS 235,072  3/1910  Germany ............................ 251/174

OTHER PUBLICATIONS 516,956 01001940 UK 251 174

Primary Examiner—Kyle L. Howell
Assistant Examiner—Henry J. Recla
Attorney, Agent, or Firm—Lewis H. Eslinger

[57] ABSTRACT

A pressure regulator for breathing apparatus, which comprises a valve cooperating with a seat formed by the end of a nozzle which is axially movable inside a cylindrical chamber, said seat being surrounded by a hollow member of revolution having one end open, in which the valve engages.

6 Claims, 7 Drawing Figures

PRESSURE REGULATOR FOR BREATHING APPARATUS

The present invention relates to a pressure-regulator for breathing apparatus, for example for a diver's apparatus or the like.

This pressure regulator is intended, for example, to equip the second stage of a two-stage pressure-regulator, in order to ensure a better distribution of air.

In known devices of this type, it was difficult to balance, at each instant, the calibrated return spring of the valve, intended to compensate for the pressure of the air distributed by the first stage, when the fact of the diver breathing in created a depression causing the distributor valve to separate from its seat forming the diffusion nozzle, via a lever abutting on the deformable wall in contact with the water. Moreover, in the absence of pressure, when the pressure-regulator was not connected, the bearing surface of the valve, made of elastic material, rapidly became damaged since the force of the return spring, applying the valve against its seat, was no longer compensated for by the pressure of the air issuing from the feed nozzle, causing irreversible deformations of the valve and maladjustment of the pressure-regulator, this obliging the useful surface of the valve to be reduced in order to limit the forces, thus reduce the diameter of the nozzle and consequently the flow of air.

It is an object of the present invention to eliminate these drawbacks by limiting wear and tear of the valve and by ensuring the automatic regulation of the opening of the valve enabling the pressurized air coming from the first stage of the pressure regulator to communicate with the mouthpiece fitted in the diver's mouth, compensating at each instant the action of the return spring of the valve and of the rod for controlling opening, connected to the deformable membrane undergoing the pressure of the water.

The pressure regulators according to the invention comprise, in known manner:

a casing divided into two compartments separated by a semi-rigid, deformable membrane;

a first compartment which communicates with the ambient medium and a second compartment which comprises a mouthpiece and a low-pressure air inlet conduit;

a valve located in the second compartment which is provided with a control rod and with a first return spring which maintains said valve applied against a seat;

a lever which connects the free end of said rod to said semi-rigid membrane and which automatically controls the displacements of said valve as a function of the difference in pressure which is exerted on the two sides of the membrane.

The object of the invention is attained by means of a pressure regulator of this type in which the seat is constituted by one end of a nozzle, coaxial with the valve and the air inlet conduit, which nozzle is axially movable and occupies two different positions according to whether or not the pressure-regulator is connected to a source of compressed air.

In a preferred embodiment, this nozzle has two axially opposite ends, one of which forms the seat of the valve whilst the other is fixed to a hollow piston, coaxial with said nozzle, which slides axially inside a cylindrical chamber, a first end of which is connected to said air inlet conduit, which piston is maintained in abutment against the second end of said cylindrical chamber by the pressure of the compressed air which is exerted on said piston when said conduit is fed with compressed air.

The valve is housed inside a hollow cylindrical body comprising a side aperture and a hollow member of revolution which surrounds the seat and which is coaxial therewith and with the valve, which member and valve are so sectioned that they define an annular air passage Sa whose width varies as a function of the position of the valve.

In a preferred embodiment, the valve is cylindrical and said hollow member is truncated and has one end open, towards which it diverges and the valve is engaged inside this end.

The invention will be more readily understood on reading the following description with reference to the accompanying drawings, in which.

In these Figures, like elements have like reference numerals.

Figure 1:
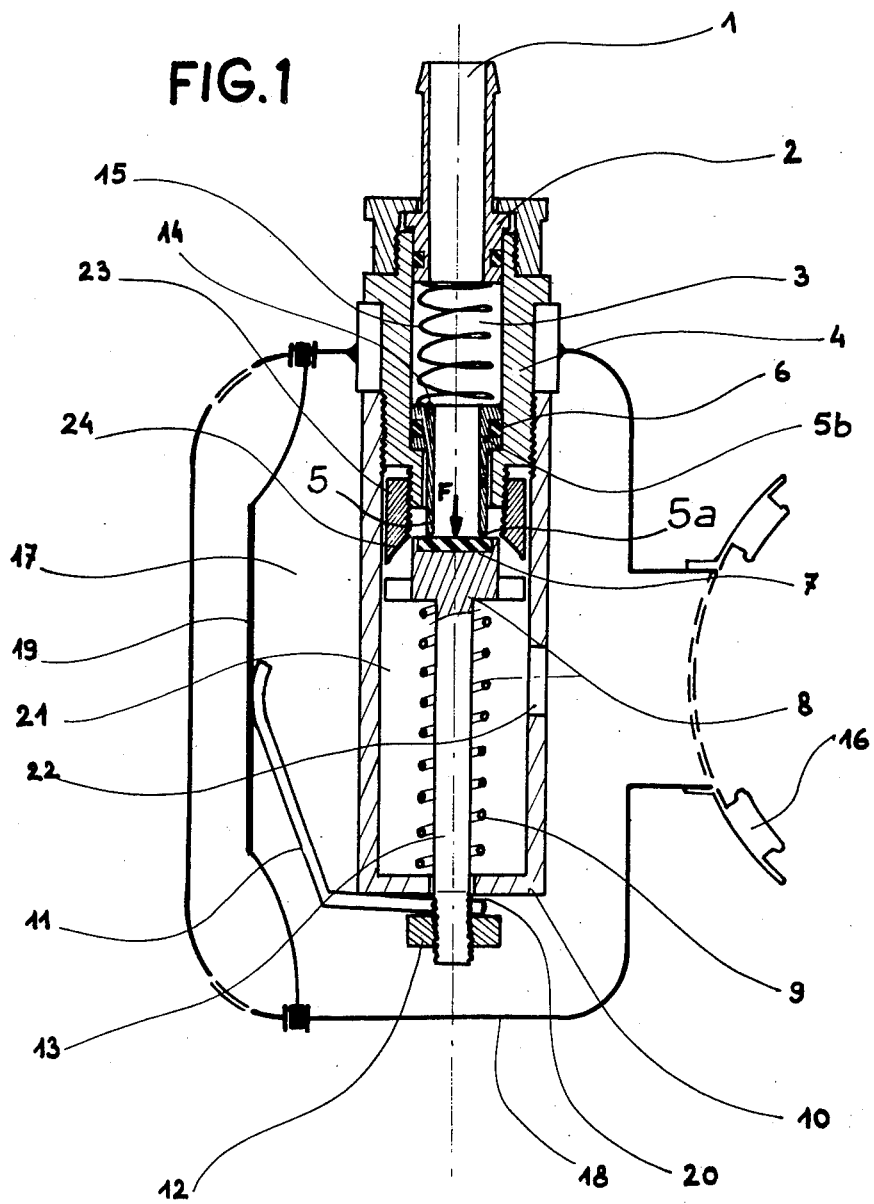
FIG. 1 is an axial section through a pressure-regulator for a diver's breathing apparatus according to the invention.
Figure 2:
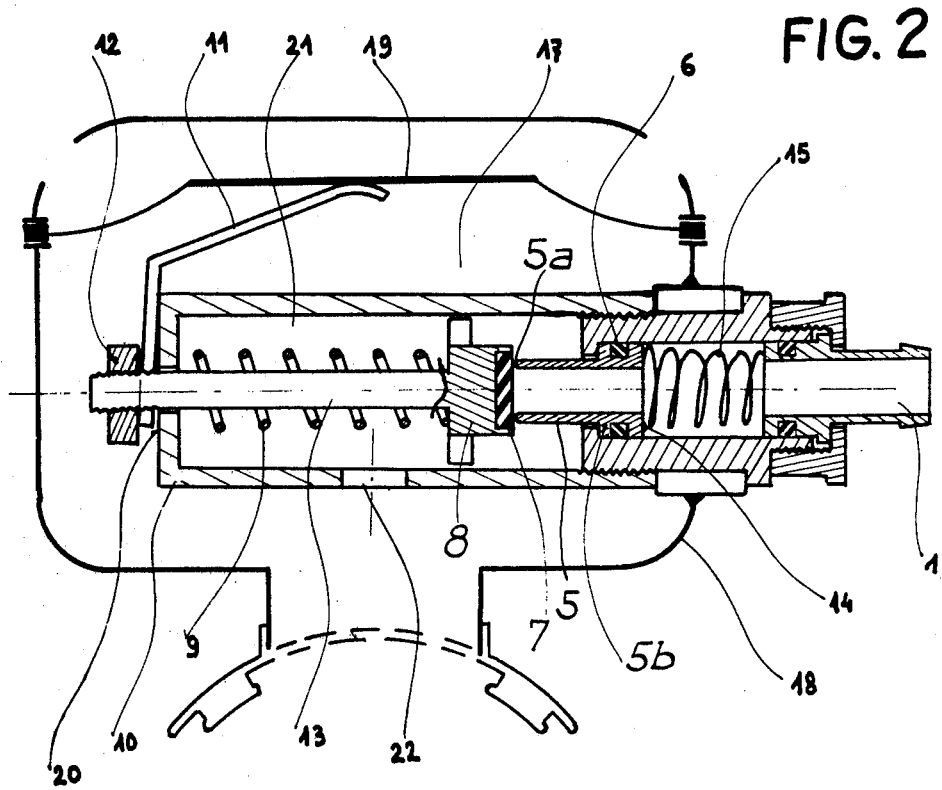
FIGS. 2 and 3 are axial sections through a variant embodiment comprising solely the movable seat device, one in the position where the pressure-regulator is connected to a source of compressed air (FIG. 2) and the other in the position where the pressure-regulator is disconnected (FIG. 3).

Referring now to the drawings, the air or any other breathing gas mixture, compressed at high pressure and contained in cylinders, is allowed to expand in a first stage (not shown) and arrives, at low pressure, of the order of a few bars, at the inlet 1 of a union 2 of a second pressure-regulator.

This air penetrates into a cylindrical chamber 3 located inside an intermediate member 4 and included between the union 2 and a movable nozzle 5 whose end 5a constitutes the seat.

The rear end of the nozzle 5, opposite the seat 5a, is fixed to a piston 5b which slides axially in the chamber 3. An O-ring 6 ensures the seal between the piston and the walls of the chamber 3.

The air then arrives against the pellet member 7 made of elastic material forming part of the valve 8.

This low pressure air exerts a force F against the valve, proportional to the surface of the seat forming nozzle and to the pressure of the air, which tends to separate the valve from its seat. The valve is balanced in its position against the seat by a spring 9 whose force is slightly greater than F — in order to ensure the valve/seat seal — and bearing on the body 10.

A lever 11 located between a nut 12 screwed on the control rod 13 of the valve, and the body 10, enables the valve to be separated from its seat when the fact of the diver breathing on the mouthpiece 16 creates a depression in the chamber 17 — defined by the casing 18 and the membrane 19 — thus causing the depression of the semi-rigid membrane 19.

A certain functional clearance 20 exists between the nut 12, the lever 11 and the body 10, which is due to the fact that the valve 8 bears on its seat 5, in the same way as on a seat which would be fixed. In fact, the ratio of the diameters of the seat forming nozzle, determining the annular rear surface 14, included between the nozzle and the inner diameter of the member 10, is such that, when the pressure-regulator is fed with low pressure air, a force is exerted on the seat which applies it in fixed position at the end of the member 4.

The force of the spring 9 being only just greater than F, it suffices that the surface 14 be clearly larger than the inner surface of the diffusion nozzle, in order that the spring does not press back the seat 5 via the valve 8. At that moment, the pellet member 7 is subjected only to the slight difference of force between the spring 9 and the force F exerted by the air.

Figure 3:
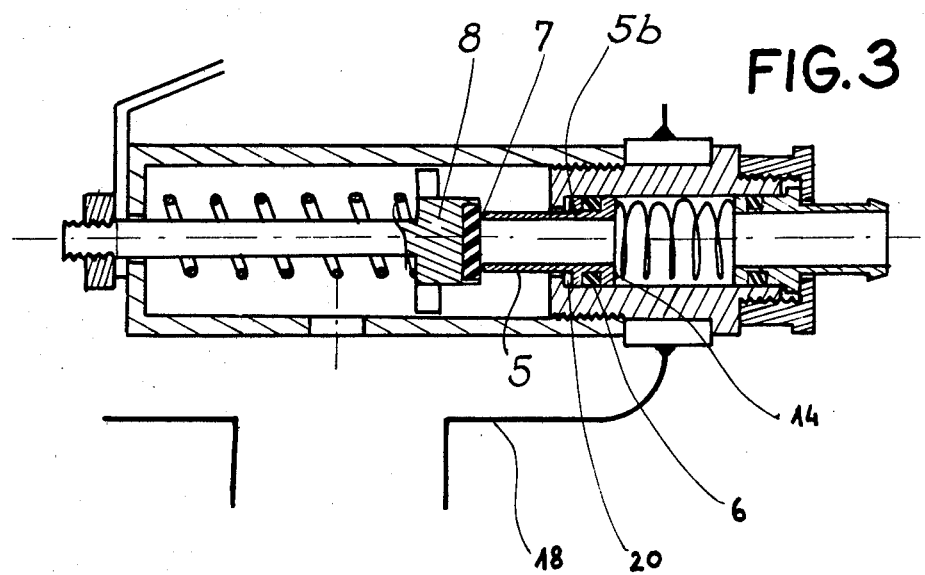

When the pressure-regulator is not connected, the valve 8 bears on the movable nozzle 5 until its movement is stopped by the nut 12. The nozzle 5 then retracts, since it is no longer applied in its position of abutment by the pressure. All that remains is the very slight force created by the spring 15, whose function is to ensure a permanent contact between the valve and its seat when the pressure-regulator is not connected. The clearance 20 is then found between the movable nozzle and its position in abutment (FIG. 3).

The pellet 7 is therefore never subjected to a considerable crushing force capable of deteriorating it, this offering three advantages:

(1) the pellet 7 does not need to be frequenctly changed.

(2) no maladjustment of the relative position of the valve 8 and seat 5 is possible, and the functional clearances are therefore definitive.

(3) it is possible to increase the flow of air by increasing the diameter of the nozzle, without fear of the increase in the force of the return spring 9 deteriorating the pellet 7.

Figure 4:
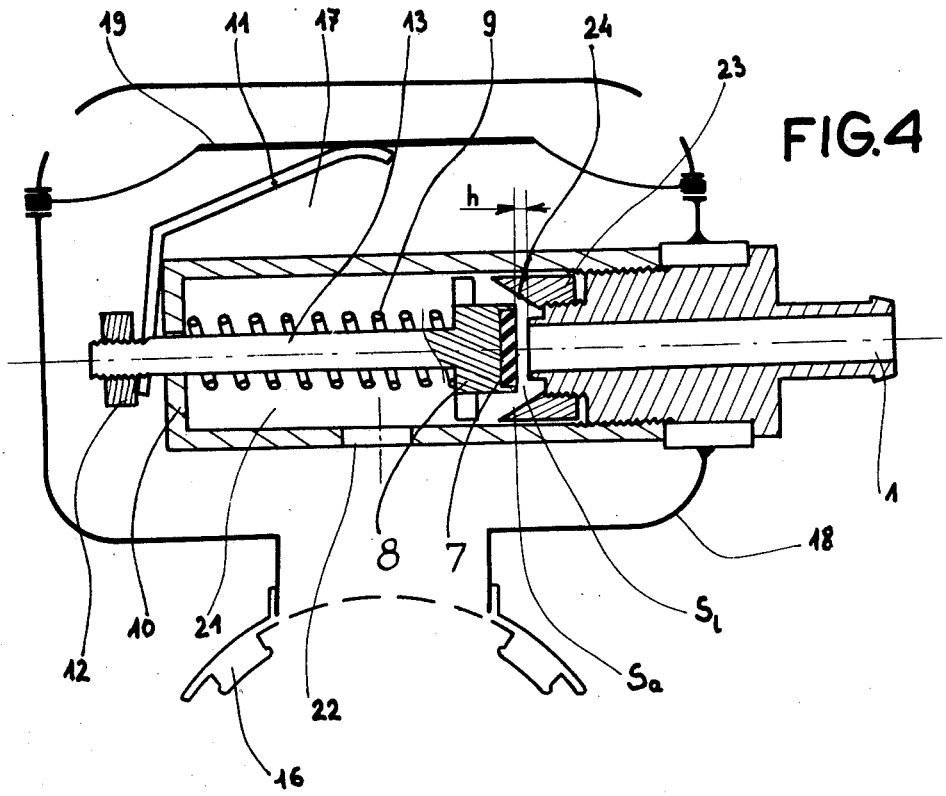
FIGS. 4 and 5 show axial sections through a pressure-regulator comprising solely a device of variable surface for air-diffusion in flow position (FIG. 4) and in rest position (FIG. 5).

When the diver breathes in, the valve 8 separates from its seat by a distance $h$ (FIG. 4). The total surface of air diffusion is then equal to the side surface, $Sl = h \times$ external circumference of the nozzle. (The flow is maximum when this side surface is equal to the surface of the nozzle).

The air delivered by Sl then flows through $Sa$, annular surface included between the valve 8 and the body 10, to arrive in chamber 21 then at injection hole 22 diffusing air towards the mouthpiece 16, for a given height $h$.

If $Sa < Sl$: the nozzle delivers more air than $Sa$ allows pass. The pressure then exerted against the valve prevents it from closing again. There is then continuous flow in the pressure-regulator.

If $Sa > Sl$: the nozzle delivers less air than $Sa$ allows pass. The pressure of the air against the valve decreases and is no longer sufficient to compensate the force of the return spring 9. The valve thus tends to close and the pressure-regulator is firm.

If $Sa = Sl$: the nozzle delivers as much air as flows through $Sa$. The pressure is identical against the valve, which is then still in equilibrium between the force of the return spring 9 and the force exerted by the air. The pressure-regulator is therefore just as supple, when the valve is separated by a height $h$, as at the exact instant of its separation from its seat, when all that exists is the slight difference in force (force of spring $9 - F$).

Figure 5:
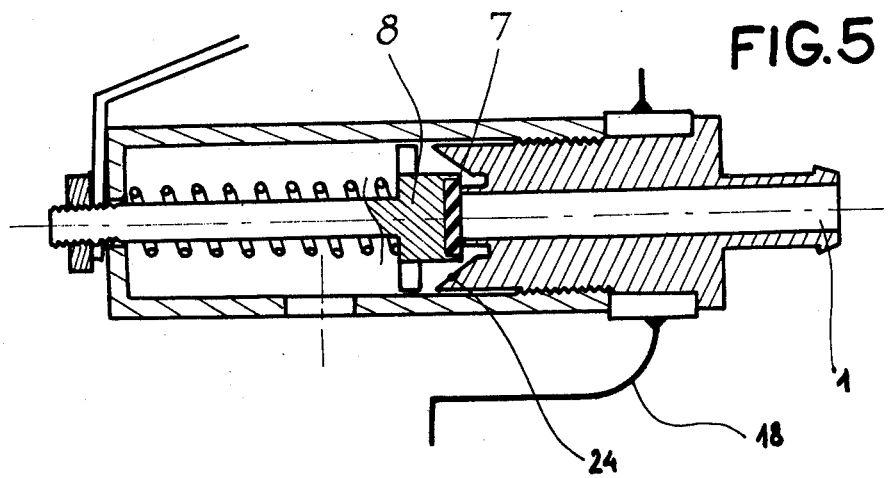
Figure 6:
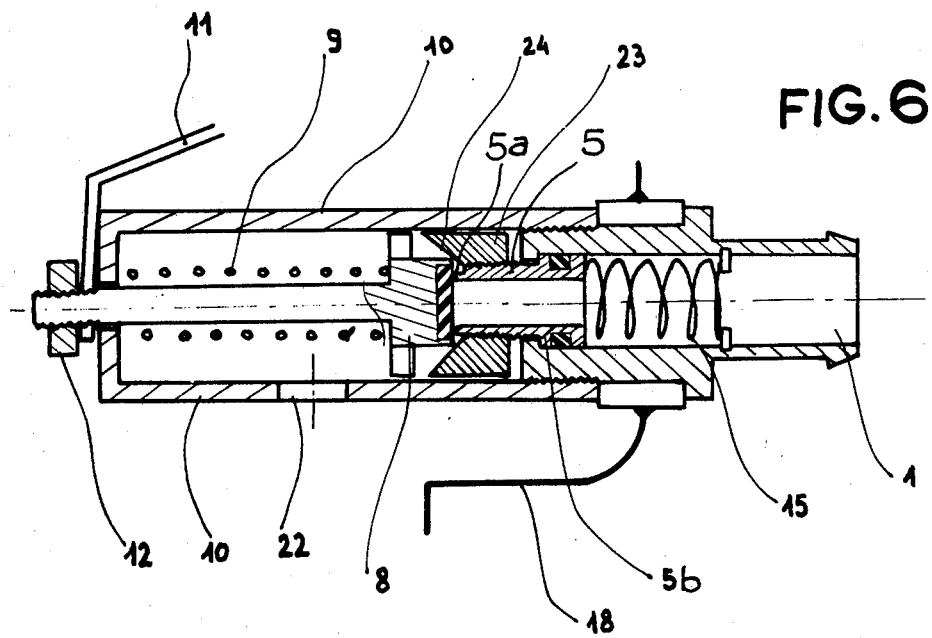
FIGS. 6 and 7 show different embodiments of the invention in axial section.

In order that, for all the values of $h$, $Sa$ always equals Sl, a member 23, comprising a section 24, for example a truncated member, is interposed between the valve and the body in which the valve slides. This member may be connected to the body 10, the member 4, the seat 5, or to the valve, or may be integral with these members or be fixed so as to offer the possibility of an adjustment of the relative position of this member 23. A few non-limiting examples of assembly are shown in FIGS. 4, 5 and 6.

Between the section 24 and the valve 8 remains the annular space $Sa$. When the valve is separated from its seat, $Sa$ increases. It is therefore possible, by judiciously choosing the section 24, to obtain a servo-control effect of the forces exerted on the valve as a function of its position, which makes it possible for the pressure-regulator to be as supple as desired for any outflow.

The shapes, dimensions and arrangements of the different elements, as well as the materials used for manufacture thereof, may vary within the limit of the equivalents without changing the general concept of the invention which has just been described.

Figure 7:
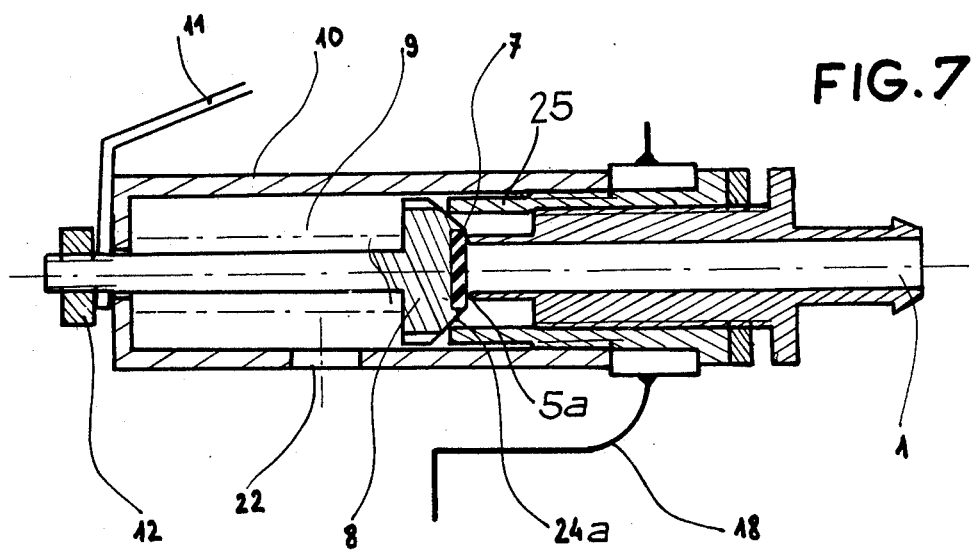

FIG. 7 shows a variant embodiment in which the valve 8 converges towards the seat 5a, with a sidewall 24a. In this example, the seat 5a is surrounded by a cylindrical hollow sleeve 25 which is coaxial with the seat 5a and with the valve 8. The internal diameter of the sleeve 25 is larger than the diameter of the seat 5a and smaller than the largest diameter of the valve 8. The sleeve 25 has one end open and the free end of the valve 8 is engaged in this open end.

What I claim is:

1. A pressure regulator for a breathing apparatus comprising: a hollow casing, a semi-rigid, deformable membrane mounted in said casing and separating the casing into first and second compartments; said casing having openings formed therein providing communication between said first compartment and the exterior of the casing; and a mouthpiece and a low pressure air inlet conduit connected to said second compartment; a regulating valve located in said second compartment for controlling the delivery of air from said inlet conduit to said second compartment, said valve including a valve seat; a valve head, a sealing pellet mounted in said valve head, a control rod having a first end secured to said valve head and a second free end, opposite said first end, and return spring means for maintaining said pellet sealingly applied against said valve seat; a lever located in said second compartment having one end operatively connected to the free end of said control rod and an opposite end operatively connected to said semi-rigid membrane for automatically displacing said control rod and said valve head away from said valve seat when the pressure in said first compartment is greater than the pressure in said second compartment, said regulating valve including a cylindrical chamber mounted in said second compartment in communication with said inlet conduit, said valve head and control rod slidably mounted in said cylindrical chamber, a nozzle slidably mounted in said cylindrical chamber for sliding movement coaxial with said valve head, said nozzle having axially opposed front and rear ends with said front end facing said valve head and defining said valve seat and said rear end including a hollow piston having two opposite front and rear faces located within said cylindrical chamber; said cylindrical chamber having two opposite ends including a rear end connected to said inlet conduit for low pressure air and a front end forming an abutment for the front face of the piston, whereby when said inlet conduit is supplied with compressed air the rear face of said piston is subjected to the pressure of the air in said chamber and the piston is maintained in a fixed position with its front face in abutment against the front end of said cylindrical chamber by said pressure, and when the inlet conduit is not connected to compressed air the rear face of the piston is no longer subjected to pressure and the piston retracts inside said chamber and draws back the nozzle and valve seat.

2. A pressure regulator as defined in claim 1, in which said valve seat further comprises a hollow member of revolution mounted in said cylindrical chamber which includes an inner wall surrounding the valve seat placed at the front end of said nozzle, coaxial with said nozzle and said valve seat, said member of revolution having two opposite front and rear ends, the front end of which is open and conically shaped and diverges towards the open end of said member, and said valve head being positioned to slide inside said hollow member and defines with said inner wall an annular passage, said valve head and said hollow member being dimensioned such that the section of said annular passage remains substantially equal to the section of the annular passage between said valve head and said valve seat.

3. A pressure regulator as defined in claim 2, in which said valve is cylindrical.

4. A pressure regulator as defined in claim 2 further comprising means between said cylindrical chamber and said hollow member for displacing axially said hollow member of revolution with respect to said valve seat.

5. A pressure regulator as defined in claim 1 in which said rear face of said hollow piston is an annular surface and when the pressure regulator is connected to a compressed air source the position of the front face of the piston in abutment against the front end of said chamber is insured by the force created by the pressure of the air on said annular surface and when the pressure regulator is not connected to a compressed air source the piston and the movable nozzle move back under the thrust of said spring means.

6. A pressure regulator as defined in claim 1 in which said cylindrical chamber includes second spring means, substantially weaker than the first mentioned spring means and placed between the rear face of said piston and the rear end of said chamber to insure a permanent contact of the valve seat against the valve head only when the pressure regulator is not connected to a source of compressed air.

* * * * *